(12) United States Patent
Teramoto

(10) Patent No.: US 7,745,998 B2
(45) Date of Patent: Jun. 29, 2010

(54) LIGHTING UNIT

(75) Inventor: Kenji Teramoto, Tokyo (JP)

(73) Assignee: Mitsubishi Electric Corporation, Tokyo (JP)

(\*) Notice: Subject to any disclaimer, the term of this patent is extended or adjusted under 35 U.S.C. 154(b) by 399 days.

(21) Appl. No.: 11/684,195

(22) Filed: Mar. 9, 2007

(65) Prior Publication Data
US 2007/0229730 A1 Oct. 4, 2007

(30) Foreign Application Priority Data
Apr. 4, 2006 (JP) ............................. 2006-102679

(51) Int. Cl.
*H01J 7/14* (2006.01)
*H01J 7/24* (2006.01)
(52) U.S. Cl. .................... 313/623; 313/11; 313/47; 445/26
(58) Field of Classification Search ............. 313/567, 313/623, 25, 39, 47; 349/65
See application file for complete search history.

(56) References Cited

U.S. PATENT DOCUMENTS

| 2,159,824 | A | * | 5/1939 | Spanner ................... 313/47 |
| 3,619,683 | A | * | 11/1971 | Weston et al. .............. 313/47 |
| 2004/0062042 | A1 | * | 4/2004 | Sotokawa et al. ........... 362/260 |
| 2006/0186782 | A1 | * | 8/2006 | Ciancanelli et al. ..... 313/318.01 |
| 2006/0274552 | A1 | * | 12/2006 | Kim et al. ................. 362/612 |

FOREIGN PATENT DOCUMENTS

| JP | 8-6019 | | 1/1996 |
| JP | 8-55608 | | 2/1996 |
| JP | 08055608 A | * | 2/1996 |
| JP | 11-133422 | | 5/1999 |
| JP | 11133422 A | * | 5/1999 |
| JP | 2000-019515 | | 1/2000 |
| JP | 2000-214461 | | 8/2000 |
| JP | 2001-133780 | | 5/2001 |
| JP | 2002-133931 | | 5/2002 |
| JP | 2004-213920 | | 7/2004 |
| JP | 2005203173 A | * | 7/2005 |

\* cited by examiner

*Primary Examiner*—Bumsuk Won
*Assistant Examiner*—Nathaniel J Lee
(74) *Attorney, Agent, or Firm*—Oblon, Spivak, McClelland, Maier & Neustadt, L.L.P.

(57) ABSTRACT

A lighting unit of the present invention comprises a light guide board, a fluorescent discharge tube provided on a side surface of the light guide board, having an electrode portion at its end portion, a lead wire having a contact connected to the electrode portion of the fluorescent discharge tube, and a holder having a cavity therein and containing the end portion of the fluorescent discharge tube and the contact of the lead wire inside the cavity. The diameter of the cavity is larger than that of the fluorescent discharge tube. With this construction, the lighting unit can suppress heat dissipation at the end portion of the fluorescent discharge tube as compared with the background art and as a result, can suppress degradation in luminance of the fluorescent discharge tube due to long term use.

20 Claims, 3 Drawing Sheets

LIGHTING UNIT

BACKGROUND OF THE INVENTION

1. Field of the Invention

The present invention relates to a plane lighting unit used for a back light of a flat panel display, and more particularly to a lighting unit in which a fluorescent discharge tube is provided on a side surface of a light guide board.

2. Description of the Background Art

In display units (monitors) of notebooks, mobile TV sets, car navigation systems and the like, liquid crystal displays which have characteristic features of light weight, slim line and low power consumption are widely used. Most of the liquid crystal displays each contain a lighting unit to achieve high-luminance display, and the construction in which the lighting unit emits illumination light from the rear side of its display element has become the mainstream.

The lighting unit using a fluorescent discharge tube, which is used for a liquid crystal display, is roughly classified into two major types, i.e., an edgelight type in which a light guide board is provided on an emission surface and a fluorescent discharge tube is provided on a side surface of the light guide board and a direct type in which a plurality of fluorescent discharge tubes are provided on an emission surface. Among these two major types, the edgelight type which has an advantage of being slim and light is used for the liquid crystal displays of notebooks, mobile TV sets, car navigation systems and the like. Japanese Patent Application Laid Open Gazette No. 8-6019 (Patent Document 1) shows an invention to improve the luminance of the edgelight type unit.

When a high voltage is applied between electrodes provided at both end portions of the fluorescent discharge tube, electrical discharge is caused. Mercury sealed inside the tube is vaporized and excited by the electrical discharge. A fluorescent film formed on an inner wall of the fluorescent tube is stimulated by ultraviolet rays generated by the excitation, to thereby emit visible light. Since a holder which protects the end portion of the fluorescent discharge tube, however, radiates heat of the fluorescent discharge tube which is in contact with it to the outside of itself, most of mercury vapor is cooled and condensed at the end portion of the fluorescent discharge tube. If the electrical discharge is caused in such a state, the mercury condensed at the end portion is taken in a sputtering material or the like released from the electrode provided at the end portion. As a result, the amount of generated mercury vapor in the entire fluorescent discharge tube becomes low as the discharge time goes by, and the luminance disadvantageously decreases.

To solve this problem, Patent Document 1 shows an invention whose characteristic feature lies in construction in which a projection provided on a holder maintains a clearance between the holder and a frame body supporting the holder with point contact, to provide space therebetween. In this invention, as a material of the holder used is a silicon resin or polycarbonate having lower thermal conductivity.

With such a construction, it is possible to reduce the heat propagated from the fluorescent discharge tube to the frame body through the holder and prevent heat dissipation at the end portion of the fluorescent discharge tube. In this construction, however, heat conduction is surely caused from the fluorescent discharge tube to the holder in accordance with the thermal conductivity of the material of the holder. Further, since the space between the holder and the frame body is not sealed, the heated air moves to the outside space, to be cooled. This results in insufficient thermal insulation.

SUMMARY OF THE INVENTION

It is an object of the present invention to provide a lighting unit which is capable of suppressing heat dissipation at the end portion of the fluorescent discharge tube as compared with the background art and as a result, capable of suppressing degradation in luminance of the fluorescent discharge tube due to long term use.

The present invention is intended to a lighting unit. According to the present invention, the lighting unit includes a light guide board, a fluorescent discharge tube, a lead wire and a holder. The fluorescent discharge tube is provided on a side surface of the light guide board and has an electrode portion at its end portion. The lead wire has a contact connected to the electrode portion of the fluorescent discharge tube. The holder has a cavity therein and contains the end portion of the fluorescent discharge tube and the contact of the lead wire inside the cavity. The diameter of the cavity of the holder is larger than that of the fluorescent discharge tube.

It is thereby possible to suppress heat dissipation at the end portion of the fluorescent discharge tube as compared with the background art.

These and other objects, features, aspects and advantages of the present invention will become more apparent from the following detailed description of the present invention when taken in conjunction with the accompanying drawings.

DESCRIPTION OF THE PREFERRED EMBODIMENTS

The First Preferred Embodiment

Figure 1:
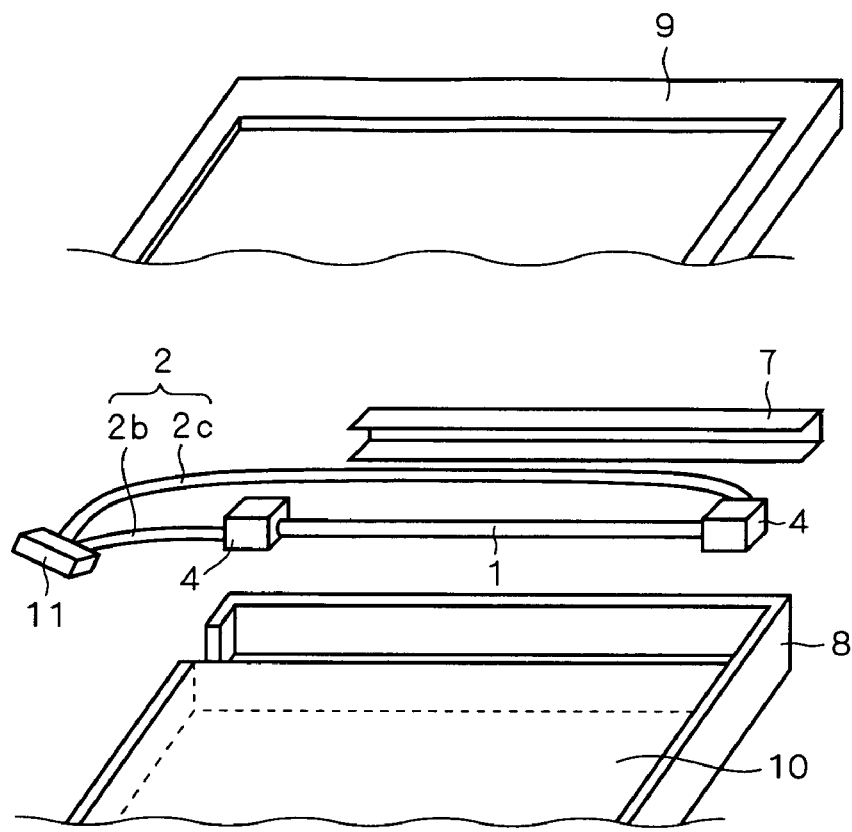
FIG. 1 is an exploded view showing a lighting unit in accordance with a first preferred embodiment.

A lighting unit of the first preferred embodiment will be described, with reference to FIG. 1. FIG. 1 is an exploded view showing the lighting unit in accordance with the first preferred embodiment of the present invention. The lighting unit comprises a light guide board 10, a fluorescent discharge tube 1, a lead wire 2 and a holder 4. The light guide board 10 is formed of, e.g., a transparent resin. The fluorescent discharge tube 1 is provided on a side surface of the light guide board 10 and has electrode portions at its both end portions. The lead wire 2 includes a high voltage lead wire 2b and a low voltage lead wire 2c. Respective one end portions of the lead wires 2b and 2c are connected to the electrode portions at both the end portions of the fluorescent discharge tube 1. The other end portions of the lead wires 2b and 2c are connected to a connector 11 used for supplying power. The holder 4 contains the fluorescent discharge tube 1 and the lead wire 2 for protection and supports the fluorescent discharge tube 1 at a predetermined arrangement position on the side surface of the light guide board 10. At the symmetrical position to the light guide board 10 with respect to the fluorescent discharge tube 1 attached is a reflector 7 for condensing light emitted from the fluorescent discharge tube 1 onto the light guide board 10. These constituents are accommodated in a lower frame body 8 and covered with an upper frame body 9, to complete the lighting unit. Further, in the lighting unit integrated are a plurality of optical sheets for radiating light propagated through the light guide board 10 equally to the liquid crystal display surface, though not shown.

Figure 2:
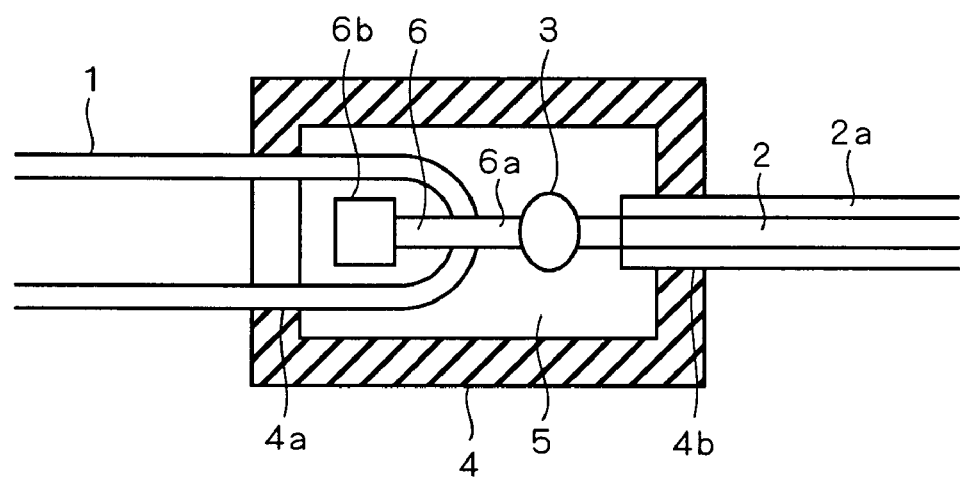
FIG. 2 is a cross section showing a holder of the lighting unit in accordance with the first preferred embodiment.

FIG. 2 is a cross section showing the inside of the holder 4. The fluorescent discharge tube 1 has an electrode portion 6 at its end portion. As shown in FIG. 2, the electrode portion 6 comprises an electrode 6b inside the fluorescent discharge tube 1 and a sealing wire 6a drawn out from the electrode 6b to the outside of the fluorescent discharge tube 1. The lead wire 2 has a contact connected to the sealing wire 6a which is a constituent of the electrode portion 6 with solder 3, and part of the lead wire 2 other than the solder-connected contact is covered with a cover 2a, to be insulated.

The holder 4 has an cavity 5 therein and inside the cavity 5, the end portion of the fluorescent discharge tube 1 and the contact of the lead wire 2 are contained. The diameter of the cavity 5 is made larger than that of the fluorescent discharge tube 1. Further, though not shown, the holder 4 is in contact with and locked by the upper frame body 9 and/or the lower frame body 8 in order to support the fluorescent discharge tube 1 at a predetermined arrangement position.

The holder 4 comprises an inlet port 4a for the fluorescent discharge tube 1 leading to the cavity 5 and an inlet port 4b for the lead wire 2 leading to the cavity 5. The diameter of the inlet port 4a is as large as that of the fluorescent discharge tube 1 and the shape thereof is the same as that of the fluorescent discharge tube 1. The diameter of the inlet port 4b is as large as that of the lead wire 2 and the shape thereof is the same as that of the lead wire 2. The fluorescent discharge tube 1 is supported by the inlet port 4a and the lead wire 2 is supported by the inlet port 4b, and the end portion of the fluorescent discharge tube 1 is thereby arranged inside the cavity 5 so that its whole circumference can be loosely fitted to prevent it from coming into contact with the holder 4. With this arrangement, an air layer is formed between the end portion of the fluorescent discharge tube 1 and an inner wall of the holder 4 which forms the cavity 5, around the whole circumference of the end portion of the fluorescent discharge tube 1. Since the inlet ports 4a and 4b have the same size and shape as the respective supporting objects, the cavity 5 is sealed inside the holder 4.

The inlet port 4a supports the fluorescent discharge tube 1 at a position nearer to the center of the fluorescent discharge tube 1 than the electrode 6b. With this, both the electrode 6b and the sealing wire 6a are contained inside the cavity 5.

In the lighting unit having the above construction, since the diameter of the cavity 5 is larger than that of the fluorescent discharge tube 1, it is possible to reduce the area of contact between the fluorescent discharge tube 1 and the holder 4. Since heat conduction from the fluorescent discharge tube 1 to the upper frame body 9 and the lower frame body 8 through the holder 4 thereby decreases, it is possible to reduce heat dissipation at the end portion of the fluorescent discharge tube 1. Further, by providing an air layer which ensures better thermal insulation than the holder 4 around the whole circumference of the end portion of the fluorescent discharge tube 1, it is possible to improve thermal insulation at the end portion of the fluorescent discharge tube 1.

Furthermore, by sealing the air layer inside the cavity 5, it is possible to prevent the heated air from moving to the outside of the air layer. This prevents heat at the end portion of the fluorescent discharge tube 1 from being dissipated with the air and as a result, it is possible to improve the thermal insulation effect.

By containing both the electrode 6b and the sealing wire 6a inside the cavity 5, since the heat dissipated from these constituents can be sealed inside the cavity 5, by using the heat, it becomes possible to keep the heat at the end portion of the fluorescent discharge tube 1.

With the above effects, it becomes hard to condense mercury vapor at the end portion of the fluorescent discharge tube 1. Though the material of the holder is not specified in the first preferred embodiment, it is preferable to use a material of low thermal conductivity.

The Second Preferred Embodiment

The holder 4 of the first preferred embodiment can be easily formed by using an elastic body such as a silicon rubber. If a material such as polycarbonate, having high thermal insulation and high hardness, is used, however, there is a possibility that this material will damage the fluorescent discharge tube 1 when the fluorescent discharge tube 1 penetrates the inlet port 4a and this will cause degradation of the fluorescent discharge tube 1. Then, it is an object of the second preferred embodiment to easily assemble a lighting unit without damaging the fluorescent discharge tube 1 even if a hard material is used for a holder 4.

Figure 3:
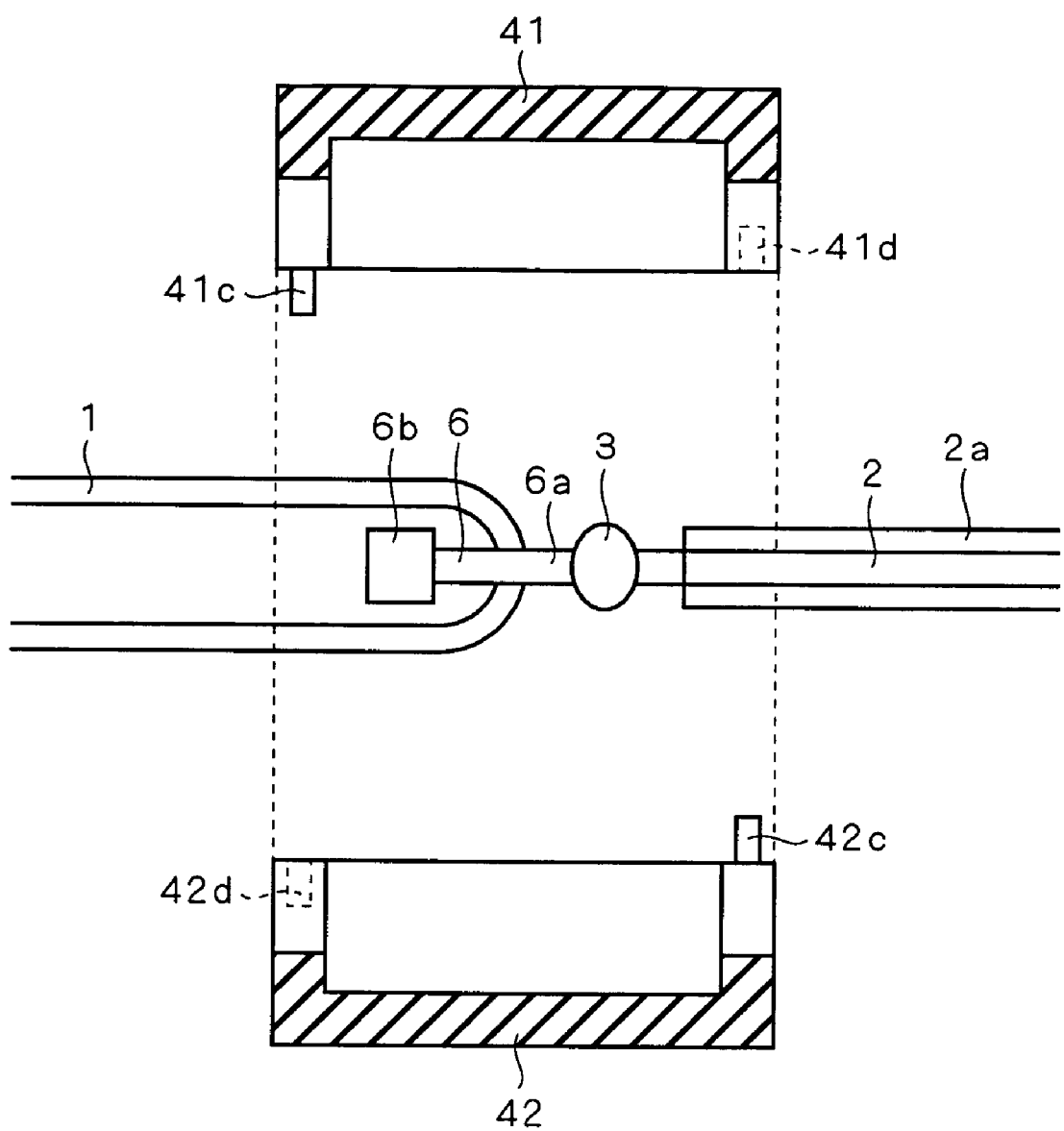
FIG. 3 is an exploded view showing a holder of a lighting unit in accordance with a second preferred embodiment.

FIG. 3 is an exploded view showing a holder of a lighting unit in accordance with the second preferred embodiment. Unless particular description will be made below, the lighting unit of the second preferred embodiment has the same constitution as that of the first preferred embodiment, and constituent elements identical to those in the lighting unit of the first preferred embodiment are represented by the same reference signs and redundant discussion will be omitted.

The holder 4 can be divided into a plurality of sidewall bodies which form the cavity 5. If the holder 4 can be divided into two sidewall bodies, for example, it is divided into an upper half holder 41 and a lower half holder 42 as shown in FIG. 3. The upper half holder 41 is provided with an upper half holder projection 41c and an upper half holder hole 41d. The lower half holder 42 is provided with a lower half holder hole 42d at a position corresponding to the upper half holder projection 41c when the upper half holder 41 and the lower half holder 42 are interlocked with each other and provided with a lower half holder projection 42c at a position corresponding to the upper half holder hole 41d. With this construction, it becomes easier to position the upper half holder 41 and the lower half holder 42 when these are interlocked with each other.

With the above construction, it is possible to easily assemble the lighting unit of the first preferred embodiment without damaging the fluorescent discharge tube 1 even if a hard material such as polycarbonate is used for the holder to achieve a high thermal insulation effect. Further, if the holder 4 is an integral-type one, it is necessary to attach the connector 11 after the holders 4 are attached to both the end portions of the fluorescent discharge tube 1, but when the holder 4 is a sectional-type one, it becomes possible to attach the holders 4 to the end portions of the fluorescent discharge tube 1 after the connector 11 is attached. Therefore, it is possible to flexibly change the order of assembling and increase productivity.

The Third Preferred Embodiment

Figure 4:
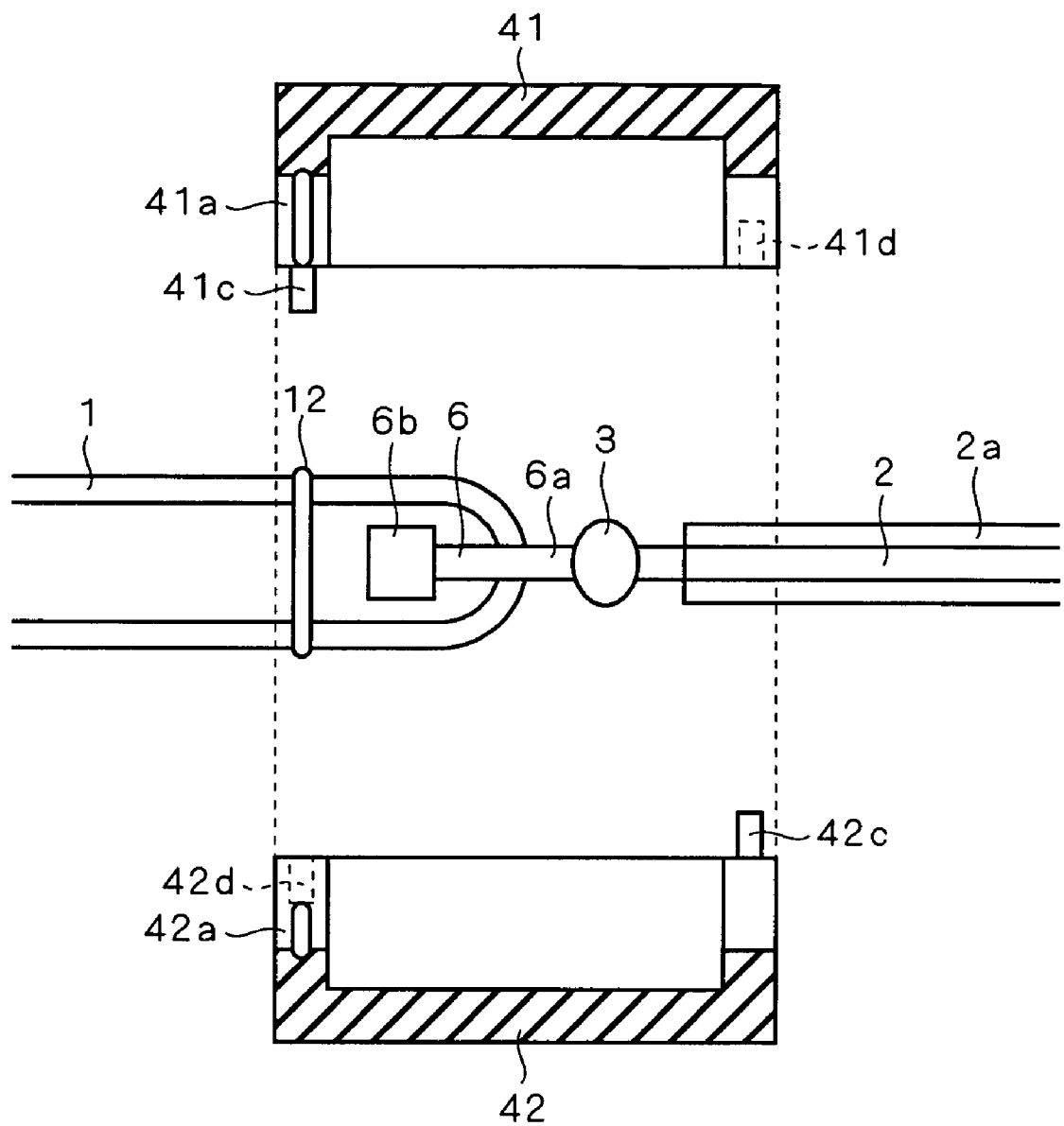
FIG. 4 is an exploded view showing a holder of a lighting unit in accordance with a third preferred embodiment.

Though it is assumed that a hard material such as polycarbonate is used for the holder 4 in the second preferred embodiment, if the lighting unit of the first preferred embodiment is formed of such a material, there is apprehension that the fluorescent discharge tube 1 will break on impact. In order to prevent such breakage, a lighting unit of the third preferred embodiment has such a construction as shown in FIG. 4.

An O ring 12 which is a elastic body is provided on a surface of the fluorescent discharge tube 1 which is in contact with an upper half holder inlet port 41a and a lower half holder inlet port 42a which constitute the inlet port 4a. On the other hand, in the internal diameter of the inlet port 4a formed is a groove for preventing deviation of the O ring 12. Then, when the upper half holder 41 and the lower half holder 42 are interlocked with each other, the O ring 12 is provided between the fluorescent discharge tube 1 and the holder 4 at the inlet port 4a.

With the above construction, even if a hard material such as polycarbonate is used for the holder 4, when an impact is given, the elastic body such as the O ring 12 absorbs the impact, and it is therefore possible to achieve a lighting unit having high impact resistance.

While the invention has been shown and described in detail, the foregoing description is in all aspects illustrative and not restrictive. It is therefore understood that numerous modifications and variations can be devised without departing from the scope of the invention.

What is claimed is:

1. A lighting unit comprising:
   a light guide board;
   a fluorescent discharge tube provided on a side surface of said light guide board, said fluorescent discharge tube including an electrode portion at an end portion of said fluorescent discharge tube;
   a lead wire including a contact connected to said electrode portion of said fluorescent discharge tube; and
   a holder forming a cavity around an entire circumference of said end portion of said fluorescent discharge tube, said cavity forming an air layer between said end portion of said fluorescent discharge tube and an inner wall of said holder, said cavity containing said end portion of said fluorescent discharge tube and said contact of said lead wire inside said cavity, wherein
   an inner diameter of said cavity of said holder is larger than an outer diameter of said fluorescent discharge tube, and
   said end portion of said fluorescent discharge tube is set inside said cavity so that said entire circumference of said end portion is loosely fitted within said cavity, to thereby form said air layer.

2. The lighting unit according to claim 1, wherein
   said holder supports said fluorescent discharge tube at a predetermined arrangement position on said side surface of said light guide board.

3. The lighting unit according to claim 1, wherein said electrode portion comprises:
   an electrode inside said fluorescent discharge tube; and
   a sealing wire drawn out from said electrode to an outside of said fluorescent discharge tube,
   and wherein both said electrode and said sealing wire are contained in said cavity.

4. The lighting unit according to claim 1, wherein
   said holder is divided into a plurality of sidewall bodies which form said cavity.

5. The lighting unit according to claim 1, wherein
   said holder comprises a first interlocking portion including a hole, and a second interlocking portion including a projection which is configured to engage said hole of said first interlocking portion of the holder, said first and second interlocking portions configured to be interlockingly engaged and thereby forming said cavity of said holder.

6. The lighting unit according to claim 1, the lighting unit further comprising:
   a reflector configured to reflect light from said fluorescent discharge tube onto said light guide board, said holder being configured to be removably engaged with said reflector.

7. A lighting unit comprising:
   a light guide board;
   a fluorescent discharge tube provided on a side surface of said light guide board, said fluorescent discharge tube including an electrode portion at an end portion of said fluorescent discharge tube;
   a lead wire including a contact connected to said electrode portion of said fluorescent discharge tube; and
   a holder including a cavity, said cavity containing said end portion of said fluorescent discharge tube, a space between said end portion and said holder, and said contact of said lead wire inside said cavity, wherein
   an inner diameter of said cavity of said holder is larger than an outer diameter of said fluorescent discharge tube, and said cavity is sealed inside said holder.

8. The lighting unit according to claim 7, wherein
   said holder supports said fluorescent discharge tube at a predetermined arrangement position on said side surface of said light guide board.

9. The lighting unit according to claim 7, wherein said electrode portion comprises:
   an electrode inside said fluorescent discharge tube; and
   a sealing wire drawn out from said electrode to an outside of said fluorescent discharge tube, and wherein
   both said electrode and said sealing wire are contained in said cavity.

10. The lighting unit according to claim 7, wherein
    said holder is divided into a plurality of sidewall bodies which form said cavity.

11. The lighting unit according to claim 7, wherein
    said holder comprises a first interlocking portion including a hole, and a second interlocking portion including a projection which is configured to engage said hole of said first interlocking portion of the holder, said first and second interlocking portions configured to be interlockingly engaged and thereby forming said cavity of said holder.

12. The lighting unit according to claim 7, the lighting unit further comprising:
    a reflector configured to reflect light from said fluorescent discharge tube onto said light guide board, said holder being configured to be removably engaged with said reflector.

13. A lighting unit comprising:
    a light guide board;
    a fluorescent discharge tube provided on a side surface of said light guide board, said fluorescent discharge tube including an electrode portion at an end portion of said fluorescent discharge tube;
    a lead wire including a contact connected to said electrode portion of said fluorescent discharge tube;
    a holder including a cavity, said cavity containing said end portion of said fluorescent discharge tube, a space between said end portion and said holder, and said contact of said lead wire inside said cavity, and said holder comprising an inlet port for said fluorescent discharge tube leading to said cavity; and
    an elastic body provided between said fluorescent discharge tube and said holder so as to be in contact with said fluorescent discharge tube at said inlet port, wherein an inner diameter of said cavity of said holder is larger than an outer diameter of said fluorescent discharge tube.

14. The lighting unit according to claim 13, wherein said holder supports said fluorescent discharge tube at a predetermined arrangement position on said side surface of said light guide board.

15. The lighting unit according to claim 13, wherein said electrode portion comprises:
   an electrode inside said fluorescent discharge tube; and
   a sealing wire drawn out from said electrode to an outside of said fluorescent discharge tube, and wherein
   both said electrode and said sealing wire are contained in said cavity.

16. The lighting unit according to claim 13, wherein said holder is divided into a plurality of sidewall bodies which form said cavity.

17. The lighting unit according to claim 13, wherein said holder comprises a first interlocking portion including a hole, and a second interlocking portion including a projection which is configured to engage said hole of said first interlocking portion of the holder, said first and second interlocking portions configured to be interlockingly engaged and thereby forming said cavity of said holder.

18. The lighting unit according to claim 13, the lighting unit further comprising:
   a reflector configured to reflect light from said fluorescent discharge tube onto said light guide board, said holder being configured to be removably engaged with said reflector.

19. The lighting unit according to claim 13, wherein said elastic body includes an elastic o-ring.

20. The lighting unit according to claim 13, wherein said elastic body is provided between said fluorescent discharge tube and said holder along a groove of an internal circumference of said inlet port.

* * * * *